United States Patent
Mizuhashi et al.

(10) Patent No.: US 7,626,735 B2
(45) Date of Patent: Dec. 1, 2009

(54) IMAGE READING APPARATUS FOR CORRECTING IMAGES ON BOTH SIDES OF A DOCUMENT SHEET

(75) Inventors: Satoshi Mizuhashi, Kanagawa (JP); Yasuhisa Mizuta, Kanagawa (JP); Yoshitake Matsubara, Kanagawa (JP); Ayumi Onishi, Kanagawa (JP); Minoru Sodeura, Kanagawa (JP); Sadao Furuoya, Kanagawa (JP); Masato Saito, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 716 days.

(21) Appl. No.: 10/939,506

(22) Filed: Sep. 14, 2004

(65) Prior Publication Data
US 2005/0157319 A1    Jul. 21, 2005

(30) Foreign Application Priority Data
Jan. 21, 2004    (JP)    ............... 2004-012816

(51) Int. Cl.
   H04N 1/04    (2006.01)
   H04N 1/40    (2006.01)
   H04N 1/00    (2006.01)
   H04N 1/46    (2006.01)
   G03G 15/00   (2006.01)

(52) U.S. Cl. .............. 358/474; 358/408; 358/448; 358/471; 358/496; 358/515; 399/364

(58) Field of Classification Search .......... 358/400, 358/408, 443, 447, 448, 462, 471, 474, 500, 358/512, 519, 521
See application file for complete search history.

(56) References Cited

U.S. PATENT DOCUMENTS

| | | | | |
|---|---|---|---|---|
| 4,429,333 A | * | 1/1984 | Davis et al. ............... | 358/496 |
| 5,175,635 A | * | 12/1992 | Yamada et al. ............. | 358/2.1 |
| 6,061,144 A | * | 5/2000 | Mamizuka ................. | 358/1.9 |
| 6,104,689 A | * | 8/2000 | Noguchi ................ | 369/44.23 |
| 6,456,403 B1 | * | 9/2002 | Archer et al. .............. | 358/474 |
| 6,473,198 B1 | * | 10/2002 | Matama .................... | 358/1.9 |
| 6,554,388 B1 | * | 4/2003 | Wong et al. ................. | 347/19 |
| 6,683,704 B1 | * | 1/2004 | Spears et al. .............. | 358/483 |
| 6,721,074 B1 | * | 4/2004 | Kao ........................ | 358/496 |
| 7,027,194 B2 | * | 4/2006 | Kanda ..................... | 358/496 |

(Continued)

FOREIGN PATENT DOCUMENTS

CN    1429008 A    7/2003

(Continued)

*Primary Examiner*—Mark K Zimmerman
*Assistant Examiner*—Ming Hon
(74) *Attorney, Agent, or Firm*—Oliff & Berridge, PLC

(57) ABSTRACT

The invention provides an image reading apparatus includes a feeder that feeds a sheet, a transfer path on which the sheet fed by the feeder is transferred, a first reading unit that captures a first image on a first face of the sheet from one side of the transfer path to obtain first image data, a second reading unit that captures a second image on a second face of the sheet from the other side of the transfer path to obtain second image data, and a correction unit that substantially equalizes image density of the first image data and that of the second image data in a case where the first image and the second image are captured at a single transfer of the sheet through the transfer path.

25 Claims, 14 Drawing Sheets

U.S. PATENT DOCUMENTS

| | | | |
|---|---|---|---|
| 2002/0018248 A1* | 2/2002 | Ohhashi et al. | 358/474 |
| 2002/0039084 A1* | 4/2002 | Yamaguchi | 345/1.1 |
| 2003/0227654 A1* | 12/2003 | Shiraishi | 358/474 |
| 2004/0008386 A1* | 1/2004 | Shiraishi | 358/496 |
| 2004/0057086 A1* | 3/2004 | Amimoto et al. | 358/487 |
| 2004/0188919 A1* | 9/2004 | Sakamaki et al. | 271/122 |

FOREIGN PATENT DOCUMENTS

| | | |
|---|---|---|
| JP | A 07-147634 | 6/1995 |
| JP | A-2000-188666 | 7/2000 |
| JP | A 2000-244718 | 9/2000 |
| JP | A-2002-111974 | 4/2002 |
| JP | A-2003-101782 | 4/2003 |
| JP | 2003-244453 * | 8/2003 |
| JP | 2003-3244453 A * | 8/2003 |
| JP | A-2003-333327 | 11/2003 |

* cited by examiner

Select:

Sharpness

Gray scale reproduction

IMAGE READING APPARATUS FOR CORRECTING IMAGES ON BOTH SIDES OF A DOCUMENT SHEET

BACKGROUND OF THE INVENTION

1. Field of the Invention

The present invention relates to an image reader for reading an image on a document sheet and in particular to an image reader which is capable of reading the images on both sides of the document sheet through single transfer of the document sheet.

2. Description of the Related Art

In the related art, an image reader (automatic double-side image reader) which reads the image information on both sides of a document sheet without the intervention of the user. Such an automatic duplex image reader most widely employs a method for inverting a document sheet in the document inverter for data reading. When image information is input with a sheet inverted, the image on the front side of the sheet is read by a specific document reader and the sheet is inverted and is delivered to the specific document reader and the image on the rear side of the sheet is read. However, this automatic duplex reading by way of sheet inversion needs to invert a document sheet and deliver the document sheet to a document reader again after temporarily ejecting the document sheet. This requires more time for reading both sides of a document sheet thus reducing the productivity of duplex reading. In an attempt to solve this problem, there is provided a technology which automatically reads both sides of a document sheet through a single pass transfer of the document sheet.

Image readers according to the related art widely employs a system where a light emitted from a fluorescent tube is irradiated onto a document and the reflected light from the document is read with an image sensor through a minification optical system in order to read the document. An image sensor using such a system is for example a one-dimensional CCD (Charge Coupled Device) sensor which simultaneously processes image read on a single line. In this system, once read-out of a single line in the direction of a line (main scan direction) is over, the document sheet is traveled for a minute distance in the direction (sub scan direction) orthogonal to the main scan direction to read the next line. This procedure is repeated over the entire document size to complete the document read process over one page. A method for sequential scan in the sub scan direction without moving a document is available where a moving component such as a full-rate carriage or a half-rate carriage is used to move a plurality of mirrors to perform sequential scan in the sub scan direction.

In this read system, as mentioned above, it is necessary to orient a light source to a document and read the reflected light with a CCD sensor through a plurality of mirrors. This naturally led to a larger unit design. In particular, it is difficult, from the standpoint of limitation of space, to provide a plurality of image sensors so as to read both sides of a document sheet without inverting the sheet. In order to solve the problems with space, use of an image sensor called CIS (Contact Image Sensor) is under examination which reads an image with a linear sensor while using a small-shaped LED (Light Emitting Diode) as a light source and through for example a SELFOC lens.

In general, an LED has a sharp emission characteristic including the light-emission wavelength while the fluorescent lamp has a broad emission characteristic. As a result, in case the light source in one reading unit is a fluorescent lamp and that in the other reading unit is an LED, a difference in the emission spectrum between the fluorescent lamp and the LED presents the problem mentioned below in reading as monochrome images the color images formed on both sides of a document sheet.

For example, assume that the spectroscopic reflection spectrum of images formed in a document has a specific tendency (such as a dominant blue image). In this case, a reading unit using a fluorescent lamp as a light source can output a read signal in accordance with the density of the blue images because the emission spectrum of the fluorescent lamp contains a blue component. On the other hand, a reading unit using an LED as a light source, in case the emission spectrum of the LED contains a very small volume of blue component, cannot output a read signal in accordance with the density of the blue images but constantly outputs a read signal corresponding to a high density. Depending on the difference in the emission characteristic between the light sources obtains different densities on the front and rear sides concerning a blue image. This problem is not limited to an image having a blue component but may relate to an image with a dominant red component.

SUMMARY OF THE INVENTION

The invention has been accomplished to address the foregoing problems. According to one aspect of the invention, there is provided an image reading apparatus including: a feeder that feeds a sheet; a transfer path on which the sheet fed by the feeder is transferred; a first reading unit that captures a first image on a first face of the sheet from one side of the transfer path to obtain first image data; and a second reading unit that captures a second image on a second face of the sheet from the other side of the transfer path to obtain second image data; a correction unit that substantially equalizes image density of the first image data and that of the second image data in a case where the first image and the second image are captured at a single transfer of the sheet through the transfer path.

According to another aspect of the invention, there is provided an image reading apparatus including: a transfer path on which a sheet is transferred; a first reading unit that captures a first image on a first face of the sheet to obtain first image data, the first reading unit including a first light source for emitting light to the first face of the sheet from one side of the transfer path and a first sensor for receiving a reflected light from the first face of the sheet; a second reading unit that captures a second image on a second face of the sheet to obtain second image data, the second reading unit including a second light source for emitting light to the second face of the sheet from the other side of the transfer path and a second sensor for receiving a reflected light from the second face of the sheet; and a correction unit that corrects the first image data so as to substantially equalize image density of the first image data and that of the second image data in a case where the first image and the second image are captured at a single transfer of the sheet through the transfer path, wherein the second light source has a wider emission wavelength range than the first light source.

According to still another aspect of the invention, there is provided an image reading apparatus including: a first reading unit that captures a first face of a sheet from one side of the sheet to obtain at least one of first color image data and first monochrome image data; a second reading unit that captures a second face of the sheet from the other side of the sheet to obtain monochrome image data; and a correction unit that corrects the first monochrome image data based on the first color image data in a case where the first face and the second face of the sheet are captured by the first reading unit and the second reading unit in a monochrome mode.

According to yet still another aspect of the invention, there is provided An image reading apparatus including: a feeder that feeds a sheet; a transfer path on which the sheet fed by the feeder is transferred; a first reading unit that captures a first image on a first face of the sheet from one side of the transfer path to obtain first image data; a second reading unit that captures a second image on a second face of the sheet from the other side of the transfer path to obtain second image data; and an acceptor that accepts a selection concerning either (a) to bring image density of the second image data close to that of the first image data, or (b) to bring the image density of the first image data close to that of the second image data, in a case where the first image and the second image are captured at a single pass transfer of the sheet through the transfer path.

BRIEF DESCRIPTION OF THE DRAWING

Embodiments of the present invention will be described in detail based on the following figures, wherein.

DETAILED DESCRIPTION OF THE EMBODIMENTS

Embodiments of the present invention will be described below with reference to the accompanying drawings.

Figure 1:
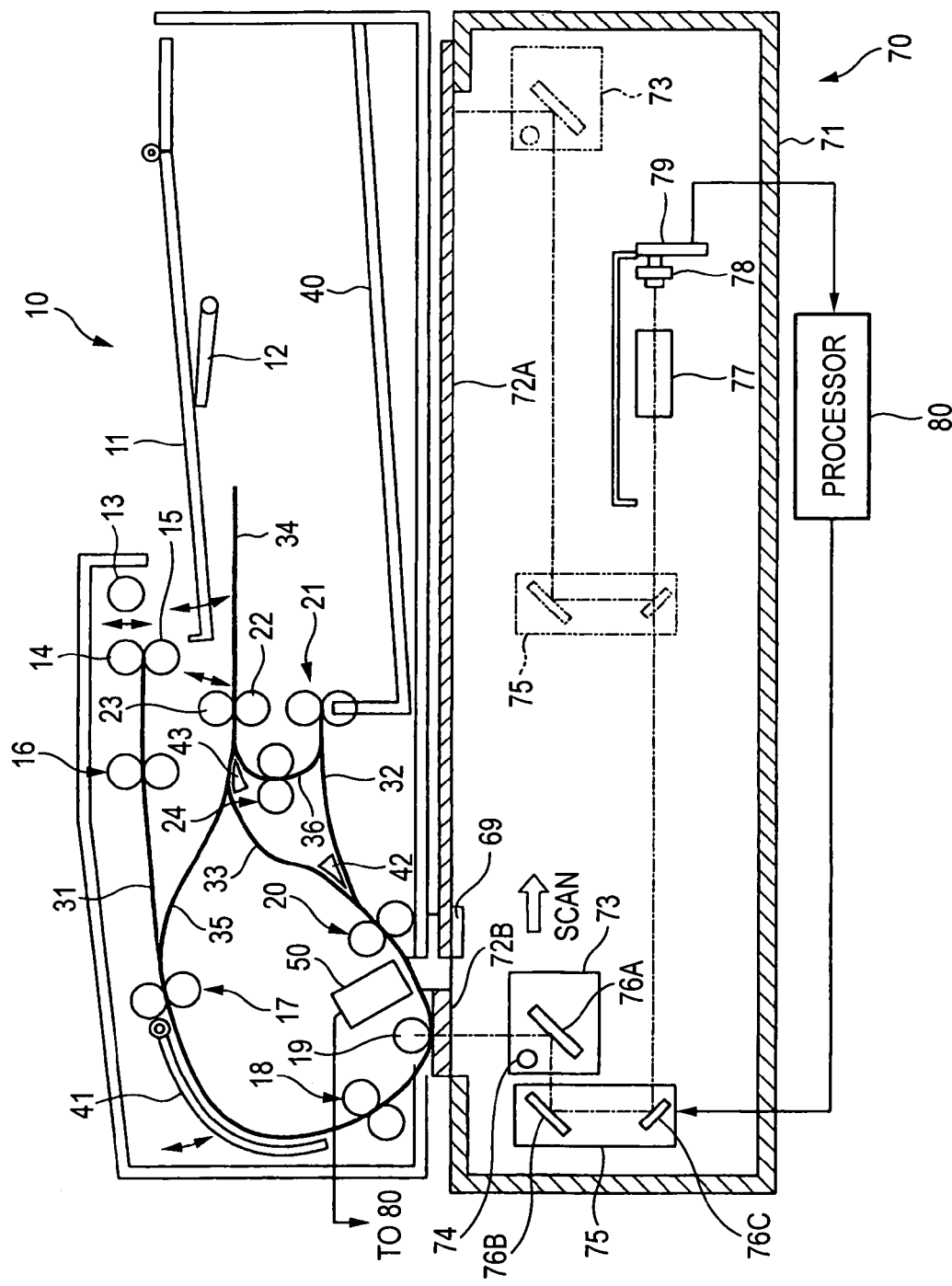
FIG. 1 shows an image reading apparatus according to Embodiment 1.

FIG. 1 shows an image reading apparatus according to Embodiment 1. The image reading apparatus is roughly classified into a document feeder 10 for sequentially feeding a document sheet from a batch of originals stacked thereon, a scanner 70 for reading an image by way of a scan, and a processor 80 for processing a read image signal.

As an exemplary component of the feeder, the document feeder 10 includes a document tray 11 for stacking a bunch of originals and a tray lifter 12 for lifting/lowering the document tray 11. The document feeder 10 also includes a nudger roll 13 for transferring a document sheet in the document tray 11 lifted by the tray lifter 12, a feed roll 14 for feeding further downstream the document sheet transferred by the nudger roll 13, and a retard roll 15 for sorting the document sheet supplied from the nudger roll 13 to separate document sheets. A first transfer path 31 on which the document is transferred first includes a take-away roll 16 for transferring a separate document sheet to a downstream roll, a pre-registration roll 17 for transferring the document sheet to a further downstream roll as well as forming a loop, a registration roll 18 for restarting the rotation with a set timing after a temporary halt feeding a document sheet while performing registration adjustment on a document reader, a platen roll 19 for assisting the transfer of a document sheet being read, and an out roll 20 for transferring a read document sheet further downstream. The first transfer path 31 further includes a baffle 41 turning on a pivot in accordance with the loop state of the document to be transferred. A CIS (Contact Image Sensor) 50 is arranged between the platen roll 19 and the out roll 20 as second read means in this embodiment.

Downstream of the out roll 20 are arranged a second transfer path 32 and a third transfer path 33. Also arranged are a transfer path switching gate 42 for switching between these transfer paths, a discharge tray 40 for stacking the documents which have been read, and a first discharge roll 21 for discharging a document sheet to the discharge tray 40. Further arranged are a fourth transfer path 34 for switching back a document sheet which has passed through the third transfer path 33, an inverter roll 22 and an inverter pinch roll 23 on the fourth transfer path 34 for actually performing switchback of a document sheet, a fifth transfer path 35 for guiding a document sheet switched back by the fourth transfer path 34 to the first transfer path 31 including the pre-registration roll 17 again, a sixth transfer path 36 for discharging a document sheet switched back by the fourth transfer path 34 to the discharge tray 40, a second discharge roll 24 on the sixth transfer path 36 for conveying a document sheet inverted and discharged to the first discharge roll 21, and an exit switching gate 43 for switching a transfer path between the fifth transfer path 35 and the sixth transfer path 36.

The nudger roll 13 is lifted and retained in an escape position in the standby state, and descends to a nip position (document transfer position) in document transfer to convey the uppermost document sheet on the document tray 11. The nudger roll 13 and the feed roll 14 transfer a document by way of concatenation of a feed clutch (not shown). The pre-registration roll 17 abuts the edge of a document sheet against the registration roll 18 which is halted to form a loop. In the formation of a loop, the registration roll 18 returns the edge of a document sheet caught into the registration roll 18. When the loop is formed, the baffle 41 opens about a pivot so as not to interfere with the document loop. The take-away roll 16 and the pre-registration roll 17 retain a loop during image reading. This loop formation adjusts the read timing as well as suppresses skew which accompanies document transfer in image reading, thereby enhancing the alignment feature. To the read start timing, the registration roll 18 at rest starts rotation and is pressed by the platen roll 19 onto second platen glass 72B (mentioned later) so as to read image data by way of a CCD image sensor (mentioned later) of the first read means from below.

On completion of reading of a single-side document sheet or on completion of simultaneous duplex reading of a double-side document sheet, the transfer path switching gate 42 is switched to guide a document sheet which has passed through the out roll 20 to the second transfer path 32 and discharge the document sheet to the discharge tray 40. The transfer path switching gate 42 is switched to guide a document sheet to the third transfer path 33 in order to invert the document sheet in sequential reading of a double-sided document. The inverter pinch roll 23, in sequential reading of a double-sided document, is released with the feed clutch (not shown) turned off and retracted, and guides a document sheet to the inverter path (the fourth transfer path 34). Then the inverter pinch roll 23 is nipped and guides a document sheet to be inverted to the pre-registration roll 17 as well as conveys a document sheet to be inverted and discharged to the second discharge roll 24 on the sixth transfer path 36. These components work as inversion transfer means.

The scanner 70 is arranged to mount the aforementioned document feeder 10. Also, the scanner 70 supports the document feeder 10 by way of an apparatus frame 71 and reads an image of a document transferred by the document feeder 10. The scanner 70 as first read means includes an apparatus frame 71 which forms an enclosure, first platen glass 72A for resting a document sheet whose image is to be read, and second platen glass 72B which forms an opening for a light used to read a document sheet being transferred by the document feeder 10.

The scanner 70 as first read means includes a full-rate carriage 73 for scanning over the entire first platen glass 72A to read the image at rest under the second platen glass 72B and a half-rate carriage 75 for providing a light obtained from the full-rate carriage 73 to an image forming section. The full-rate carriage 73 includes an illumination lamp 74 as a first light source to illuminate a light onto a document sheet and a first mirror 76A for receiving a reflected light from the document sheet. The half-rate carriage 75 includes a second mirror 76B and a third mirror 76C for providing a light obtained from the first mirror 76A to the image forming section. The scanner 70 includes an imaging lens 77 for optically reducing an optical image obtained from the third mirror 76C, a CCD (Charge Coupled Device) image sensor 78 as a first sensor for performing photoelectric conversion of an optical image formed by the imaging lens 77 and a driving substrate 79 including the CCD image sensor 78. An image signal obtained by the CCD image sensor 78 is transmitted to the processor 80 through the driving substrate 79. In this embodiment, the illumination lamp 74 is a xenon lamp.

In case the image on a document sheet placed on the first platen glass 72A is read, the full-rate carriage 73 and the half-rate carriage 75 travels in the scan direction (direction of arrow) at a ratio of 2:1. The light of the illumination lamp 74 of the full-rate carriage 73 is irradiated on the target side of the document sheet and a reflected light from the document sheet is reflected on the first mirror 76A, the second mirror 76B, and the third mirror 76C in this order and is guided to the imaging lens 77. The light guided to the imaging lens 77 forms an image on the light-receiving surface of the CCD image sensor 78. The CCD image sensor 78 is a one-dimensional sensor which simultaneously processes image read on a single line. When readout of a single line in the direction of a line (main scan direction) is over, the full-rate carriage 73 is moved in the direction (sub scan direction) orthogonal to the main scan direction to read the next line of the document sheet. This procedure is repeated over the entire document size to complete the document read process over one page.

The second platen glass 72B is for example a transparent glass plate of a long plate structure. A document sheet conveyed by the document feeder 10 passes on the second platen glass 72B. Te full-rate carriage 73 and the half-rate carriage 75 rest at a solid line positions shown in FIG. 1. The reflected light from the first line of the document sheet which has passed through the platen roll 19 of the document feeder 10 forms an image by way of the imaging lens 77 through the first mirror 76A, the second mirror 76B, and the third mirror 76C. The image is read by the CCD image sensor 78 as the first sensor in this embodiment. To be more precise, image data on one line in the main scan direction is simultaneously processed by the CCD image sensor 78 as a one-dimensional sensor. Then, the next line of the document sheet to be transferred by the document feeder 10 in the main scan direction is read. When the edge of the document sheet has reached the read position of the second platen glass 72B and the document sheet has passed through the read position of the second platen glass 72B, readout of one page in the sub scan direction is complete.

In this embodiment, it is possible to halt the full-rate carriage 73 and the half-rate carriage 75 and read the second side of a document sheet by way of the CIS 50 as a second sensor at the same time (not perfectly at the same time but during a single pass transfer of a same document sheet) while the document sheet is being conveyed as the first side of the document sheet is read by the CCD image sensor 78 on the second platen glass 72B. That is, the CCD image sensor 78 as the first sensor and the CIS 50 as the second sensor may be used to simultaneously read the images on both sides of this document sheet in a single pass transfer of the document sheet to the transfer path.

Figure 2:
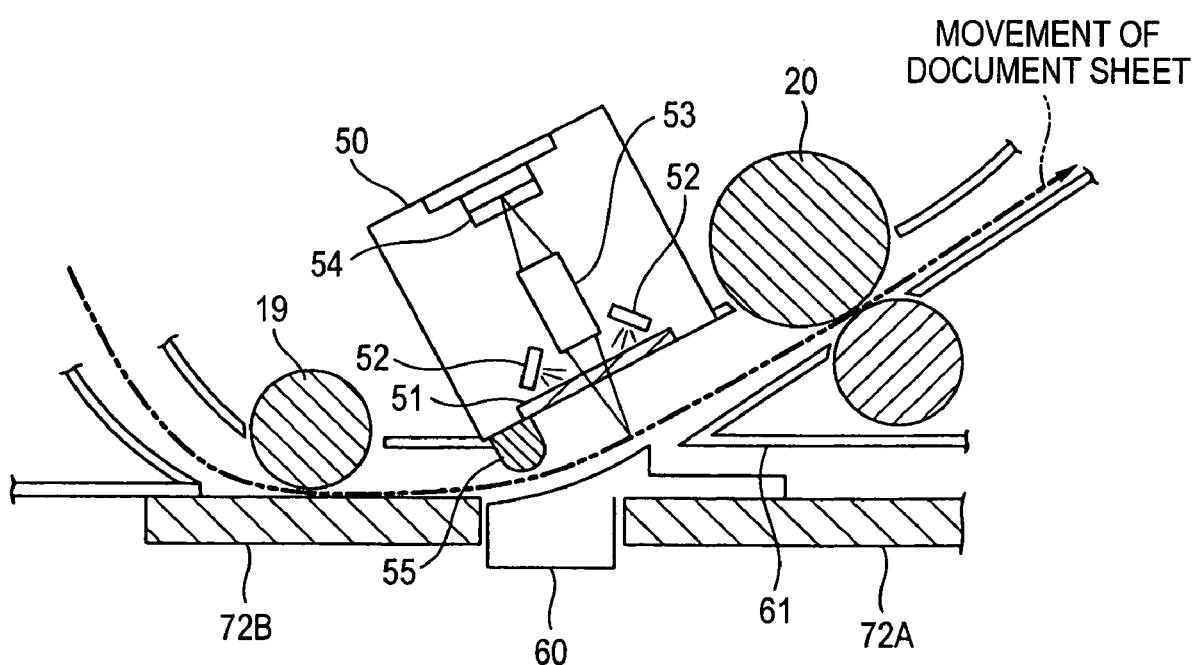
FIG. 2 illustrates a read structure using the CIS 50.

FIG. 2 illustrates a read structure using the CIS 50. As shown in FIG. 2, the CIS 50 as a second reader is provided between the platen roll 19 and the out roll 20. One side (first side or front side) of the document sheet is pressed onto the second platen glass 72B and the image on the first side is read by the CCD image sensor 78. The CIS 50 reads the image on the other side (second side or rear side) from the other side opposed to the CCD image sensor 78 through the transfer path which transfers the document sheet. The CIS 50 includes a glass plate 51, an LED (Light Emitting Diode) 52 as a second light source for irradiating a light onto the second side of a document sheet across the glass plate 51, and a SELFOC lens 53 as a lens array for condensing a reflected light from the LED 52, and a line sensor 54 as a second sensor for reading a light condensed by the SELFOC lens 53. The line sensor 54 may be a CCD, a CMOS sensor, or a contact-type sensor capable of reading an image having an actual width (for example the A4 longitudinal width of 297 mm). The CIS 50 uses the SELFOC lens 53 and the line sensor 54 to capture an image without using a minification system. This provides a simple structure as well as downsizes the enclosure and reducing the power consumption. Same as reading of an image on the first side, image data on one line in the main scan direction is simultaneously processed by the line sensor 54 as a one-dimensional sensor, followed by reading of the next line of the document sheet to be transferred in the main scan direction. In this way, reading of one page is made in the sub scan direction for the rear side of the document sheet to be transferred. In this embodiment, the color of the LED 52 is YG (yellow-green).

The transfer path of the reader includes a control member 55 extending from the enclosure of the CIS 50 and an abutting member 60 for abutting a document sheet pressed by the control member 55 in reading of an image by the CIS 50. A guide member 61 is provided downstream of the abutting member 60. The control member 55 and the abutting member 60 are provided in correspondence with the position of the transfer path in the direction orthogonal to the transfer path of a document sheet (that is, in the direction from the front side to the rear side of the document feeder 10).

Further, the CIS 50, with its SELFOC lens 53 as an optical imaging lens, has a shallow depth of focus (depth of field) of around ±0.3 mm, which is about lower than one thirteenth that obtained using the scanner 70. Reading with the CIS 50 requires that the read position of a document sheet should be defined in a predetermined narrow area. Thus, in this embodiment, the control member 55 is provided and the control member 55 is used to press the document sheet onto the abutting member 60 while the sheet is being conveyed so as to stably control the position of the document sheet between the platen roll 19 and the out roll 20. The chain double-dashed lines in FIG. 2 shows the motion of the document sheet where the control member 55 is provided. It is understood that the document sheet is being conveyed while pressed onto the abutting member 60. That is, a process of reading the document sheet being conveyed by the control member 55 while pressed onto the abutting member 60 compensates for an otherwise loose focus obtained using the CIS 50 having a shallow depth of field.

Figure 3A:
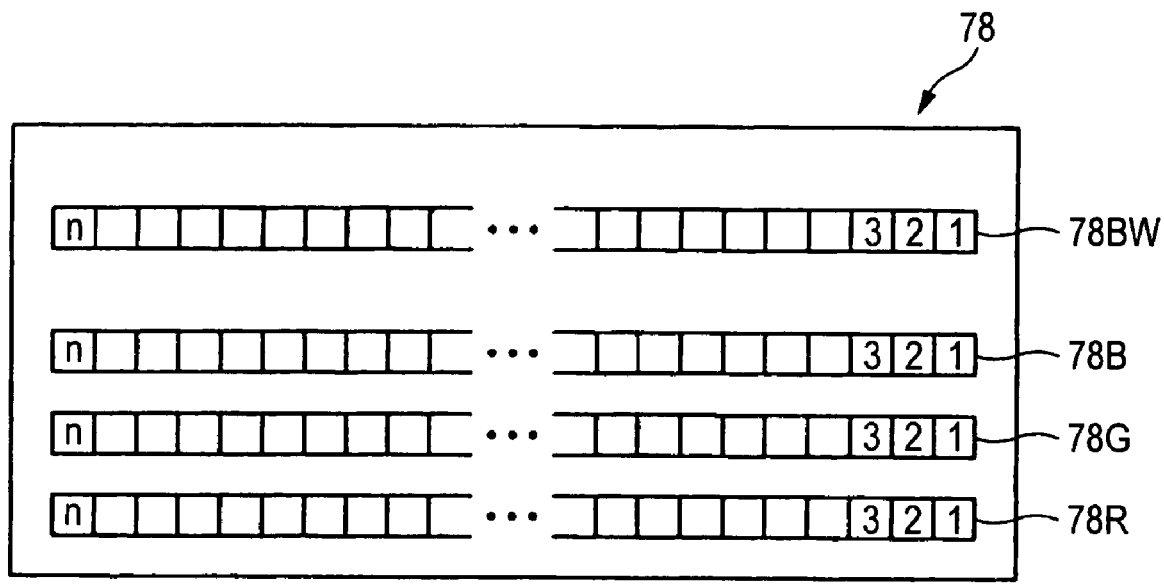
FIG. 3A is a schematic view of a CCD image sensor provided on a scanner.

FIG. 3A is a schematic view of a CCD image sensor 78 provided on a scanner 70. On the CCD sensor 78 are arranged in parallel four line sensors 78R, 78G, 78B and 78BW in the direction orthogonal to the document transfer direction. Each line sensor 78R, 78G, 78B or 78BW includes n phototransistors PT about a size of for example 10 μm by 10 μm arranged on a straight line. The interval between the line sensors 78R, 78G, and 78B is four lines while the interval between the line sensors 78B and 78BW is eight lines.

The line sensors 78R, 78G, and 78B and each has a color filter attached thereon for transmitting a wavelength component separate from each other. These color filters work as line sensors for Red, Green, and Blue, respectively, or in other words, as color sensors. The line sensor 78BW does not have a color filter so that the line sensor 78BW works as a line sensor for Black-White, that is, a monochrome sensor. The interval between the line sensor 78B for Blue and the line sensor 78BW for Black-White is broader than the other intervals because the latter has two shift registers (not shown) for transfer of electric charge in order to attain high-speed output of image data read by the latter. The line sensor 78BW for Black-White determines which of the two shift registers the image data is output to, depending on whether the pixel number (number of the phototransistor PT) is Odd or Even. The line sensor 78R for Red, line sensor 78G for Green and line sensor 78B for Blue each has a shift register for transfer of electric charge. This allows monochrome image data to be output at a higher speed than color image data.

Figure 3B:
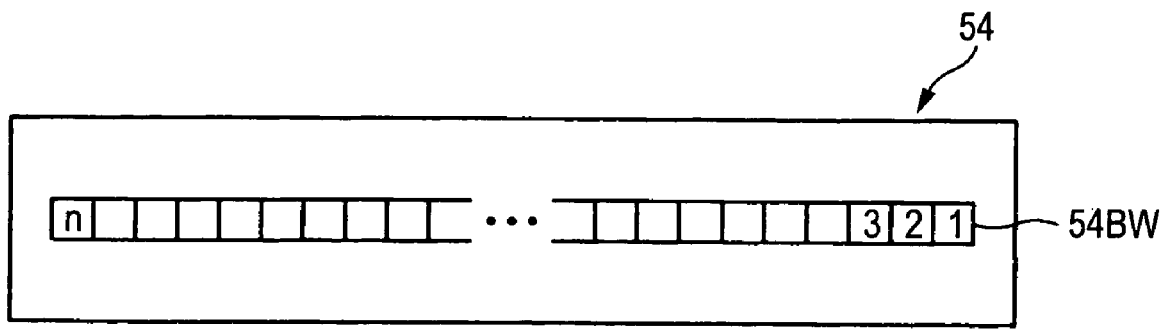
FIG. 3B is a schematic view of a line sensor provided on the CIS.

FIG. 3B is a schematic view of a line sensor 54 provided on the CIS 50. On the line sensor 54 is arranged only a line sensor 54BW for Black-White (another monochrome sensor). The line sensor 54BW includes n phototransistors PT, that is, as many n phototransistors PT as the CCD image sensor 78. Thus, an image can be read from the rear side at the same resolution as the front side. The line sensor 54BW for Black-White has two shift registers (not shown) for transfer of electric charge, same as the line sensor 78BW for Black-White provided on the CCD image sensor 78. The line sensor 54BW for Black-White determines which of the two shift registers the image data is output to, depending on whether the pixel number (number of the phototransistor PT) is Odd or Even. This allows monochrome image data to be output at a higher speed than color image data.

According to the configuration of this embodiment, the CCD image sensor 78 (scanner 70) can read and output a document image as a color or monochrome image. The line sensor 54 (CIS 50) can read and output a document image as a monochrome image.

Next, a processor 80 shown in FIG. 1 is described below.

Figure 4:
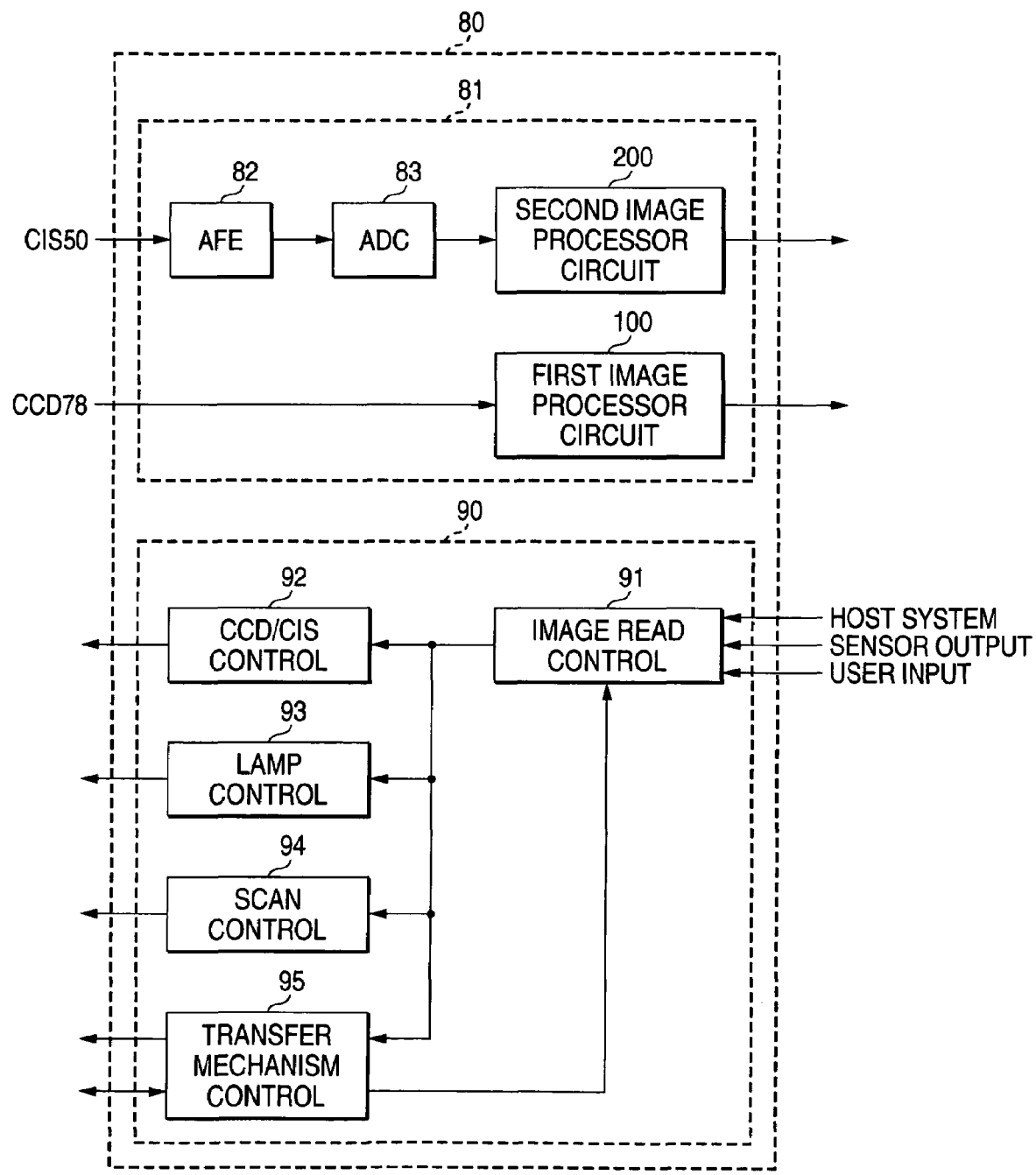
FIG. 4 is a block diagram illustrating the processor.

FIG. 4 is a block diagram illustrating the processor 80. The processor according to this embodiment is large-sized and includes a signal processor 81 for processing image information obtained from sensors (the CCD image sensor 78 and the CIS 50) and a controller 90 for controlling the document feeder 10 and the scanner 70. The signal processor 81 performs predetermined image processing on output from each of CCD image sensor 78 which reads the front side (first side) of a document sheet and the line sensor 54 of the CIS 50 which reads rear side (second side) of the document sheet. The signal processor 81 has an AFE (Analog Front End) 82 for performing analog signal processing on the output from the line sensor 54 and an ADC (Analog to Digital Converter) 83 for converting an analog signal to a digital signal. These features may be processed inside the CIS 50. The signal processor 81 includes two systems of image processor circuits for performing shading correction and offset correction on a digital signal, that is, a first image processor circuit 100 for performing image processing on the image data on the front side (first side) and a second image processor circuit 200 for performing image processing on the image data on the rear side (second side). Output from these image processor circuits is directed to an IOT (Image Output Terminal) such as a printer and a host system such as a Personal Computer (PC).

The controller 90 includes an image read control 91 for performing control over the entire document feeder 10 and scanner 70 including control of various duplex reading and one-side reading, a CCD/CIS control 92 for controlling the CCD image sensor 78 and the CIS 50, a lamp control 93 for controlling the LED 52 on the CIS 50 and the illumination lamp 74 on the full-rate carriage 73 at the read timing, a scan control 94 for turning on/off the motor in the scanner 70 to control scan operation with the full-rate carriage 73 and the half-rate carriage 75, and a transfer mechanism control 95 for performing motor control in the document feeder 10, operation of various rolls and the feed clutch, and gate switching operation. From these controls are output control signals to the document feeder 10 and the scanner 70. Such operation controls are made possible based on these control signals. The image read control 91 sets a read mode based on the control signal from the host system, a sensor output detected for example in activation of an automatic selective read feature, and the user's selection to control the document feeder 10 and the scanner 70. The read modes include a simultaneous duplex read mode using a single pass (no inversion), inverted duplex read mode using an inverted pass, and one-side read mode using a single pass.

Next, the function and operation of each image processor circuit (the first image processor circuit 100 and the second image processor circuit 200) will be described.

Figure 5:
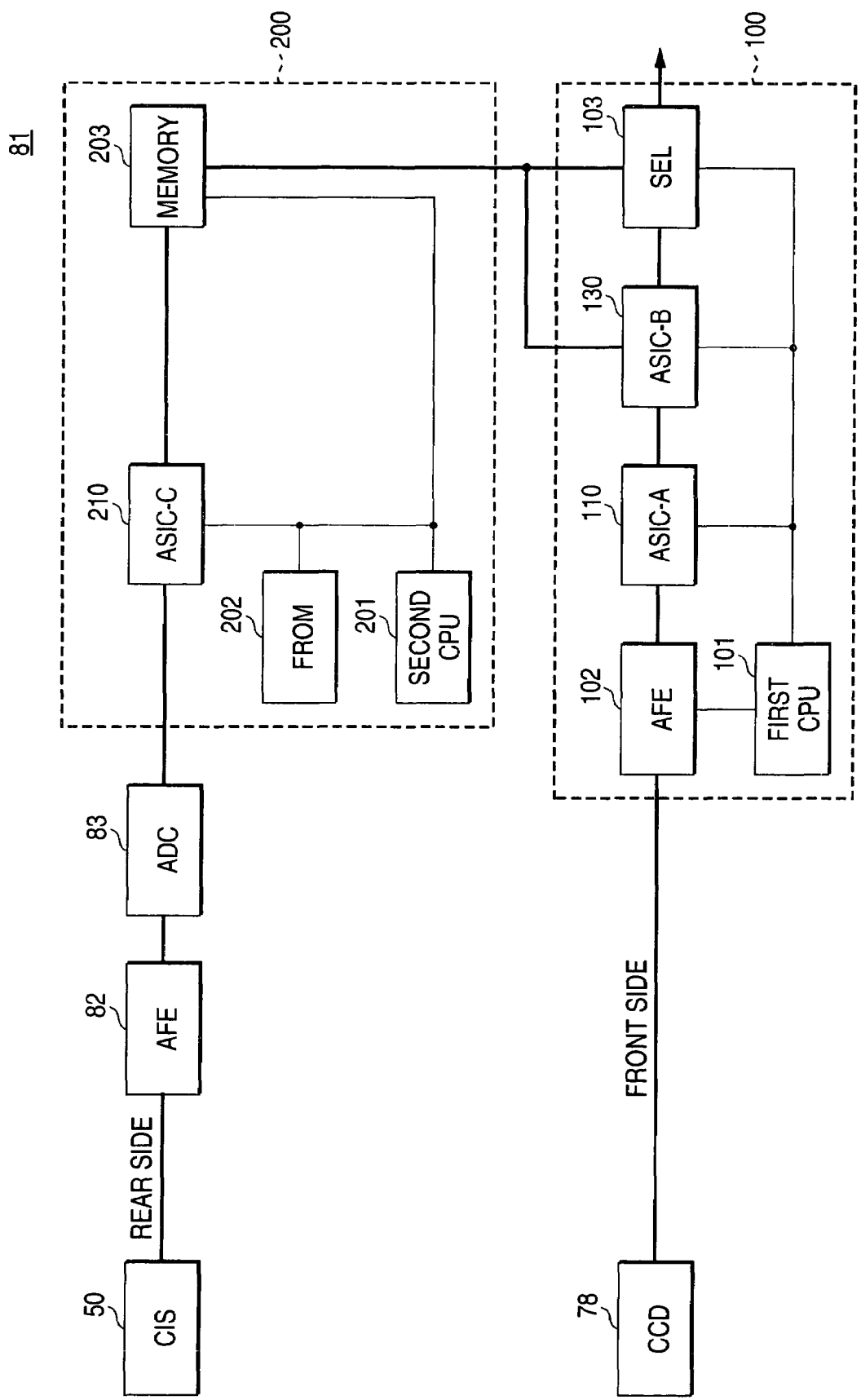
FIG. 5 is a block diagram of a detailed configuration of the signal processor according to Embodiment 1.

FIG. 5 is a block diagram of a detailed configuration of the signal processor 81. The first image processor circuit 100 includes a first CPU 101 for controlling the entire system, an AFE 102 for performing processing such as sample hold, offset adjustment and A/D conversion on front side image data output from the CCD image sensor 78 as well as a selector (SEL) 103 for selective output of image data on both sides. The first image processor circuit 100 further includes an Application-specific Integrated Circuit A (ASIC-A) 110 for performing shading correction and inter-line correction (dislocation interpolation of RGB and BW) and an Application-specific Integrated Circuit B (ASIC-B) 130 for performing MTF filtering, scaling and binarization.

The second image processor circuit 200 includes a second CPU 201 for controlling the entire system, a flash ROM (FROM) 202 for saving (storing) for example white-based shading data at shipment and the LED light quantity correction value, an Application-specific Integrated Circuit C (ASIC-C) 210 for performing various image processing on the rear-side image data obtained from the CIS 50, and a memory 203 for temporarily retaining (storing) the rear-side image data which has undergone image processing and outputting the data to the selector 103 at a predetermined output timing. In this embodiment, the CIS 50 as a contact-type image sensor for reading the rear side stores white-based shading data previously obtained at shipment into a flash ROM (FROM) 202.

Figure 6:
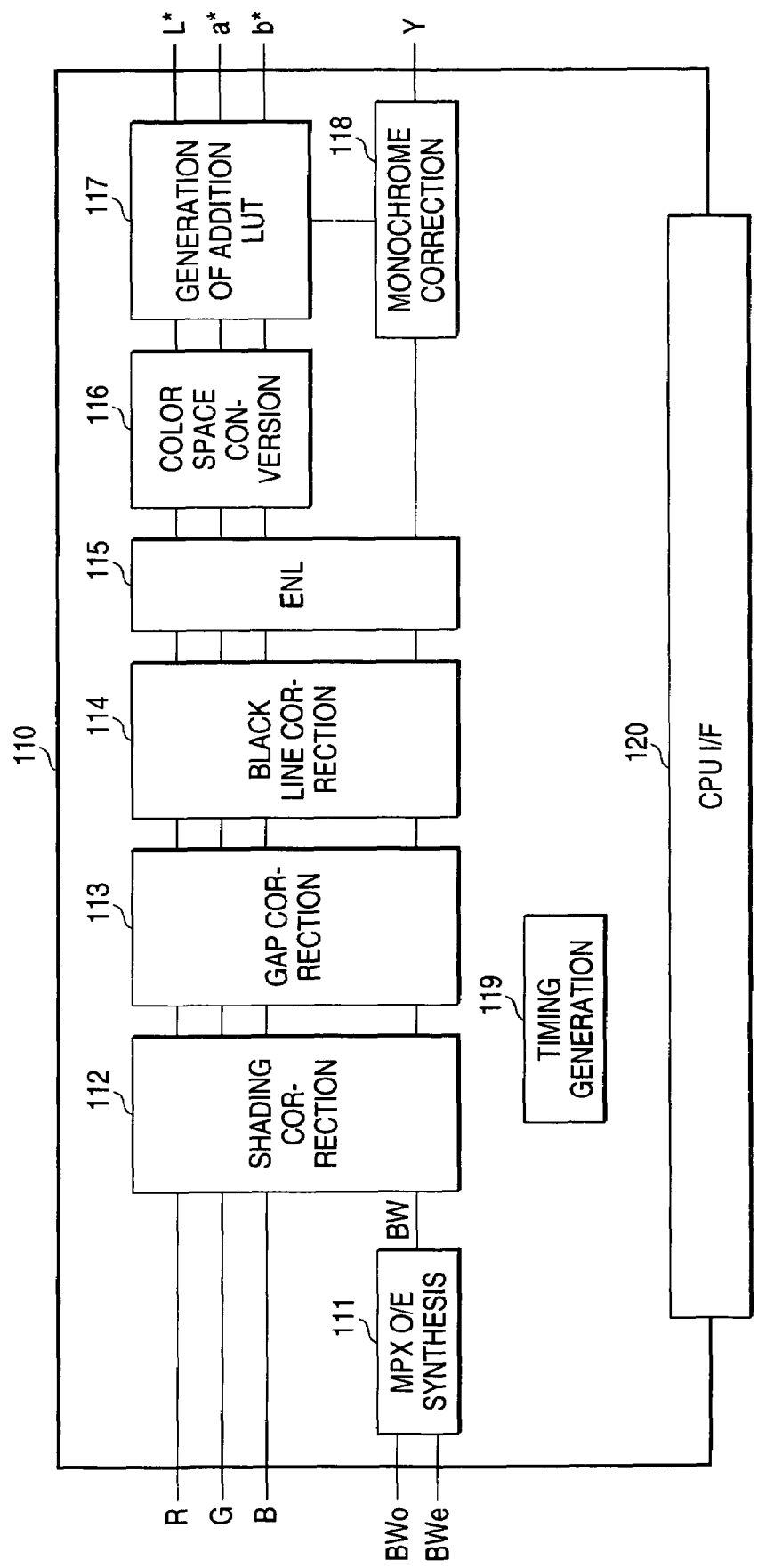
FIG. 6 is a block diagram showing a configuration of the Application-specific Integrated Circuit A (ASIC-A)

FIG. 6 is a block diagram showing a configuration of the Application-specific Integrated Circuit A (ASIC-A) 110. To the Application-specific Integrated Circuit A 110 are input an output signal (R) from the line sensor 78R for Red on the CCD image sensor 78, output (G) from the line sensor 78G for Green, an output signal (B) from the line sensor 78B for Blue, and output signals (BWo (Odd) and BWe (Even)) from the line sensor 78BW for Black-White. The Application-specific Integrated Circuit A 110 includes a multiplex (MPX) circuit 111 for synthesizing (O/E synthesizing) the monochrome output signals BWo, BWe on two channels, Odd and Even, a shading corrector 112 for correcting the shading data from the output signals R, G, B, BW (BW being obtained through synthesis of BWo and BWe), a GAP corrector 113 for correcting the positions of line sensors for three colors RGB and BW, a black line corrector 114 for correcting a black line, an ENL 115 for correcting the input gray scale, and a color space converter 116 for converting the BGR signals to chrominance signals L*a*b*. The Application-specific Integrated Circuit A 110 further includes an addition LUT generator 117 as correction value generation means for outputting the chrominance signals L*a*b* obtained through color space conversion in the color space converter 116 as well as generating an LUT (Look Up Table) for correcting the monochrome output signal BW based on the chrominance signals L*a*b* and a monochrome corrector 118 as a corrector (correction means) for correcting the monochrome output signal BW by using the generated correction LUT to output the resulting signal as a brightness signal Y. The Application-specific Integrated Circuit A 110 also includes a timing generator 119 for generating a drive clock for each of the CCD image sensor 78 and the AFE 102 and a CPU interface (CPU IF) 120 for communicating with the first CPU 101.

Figure 7:
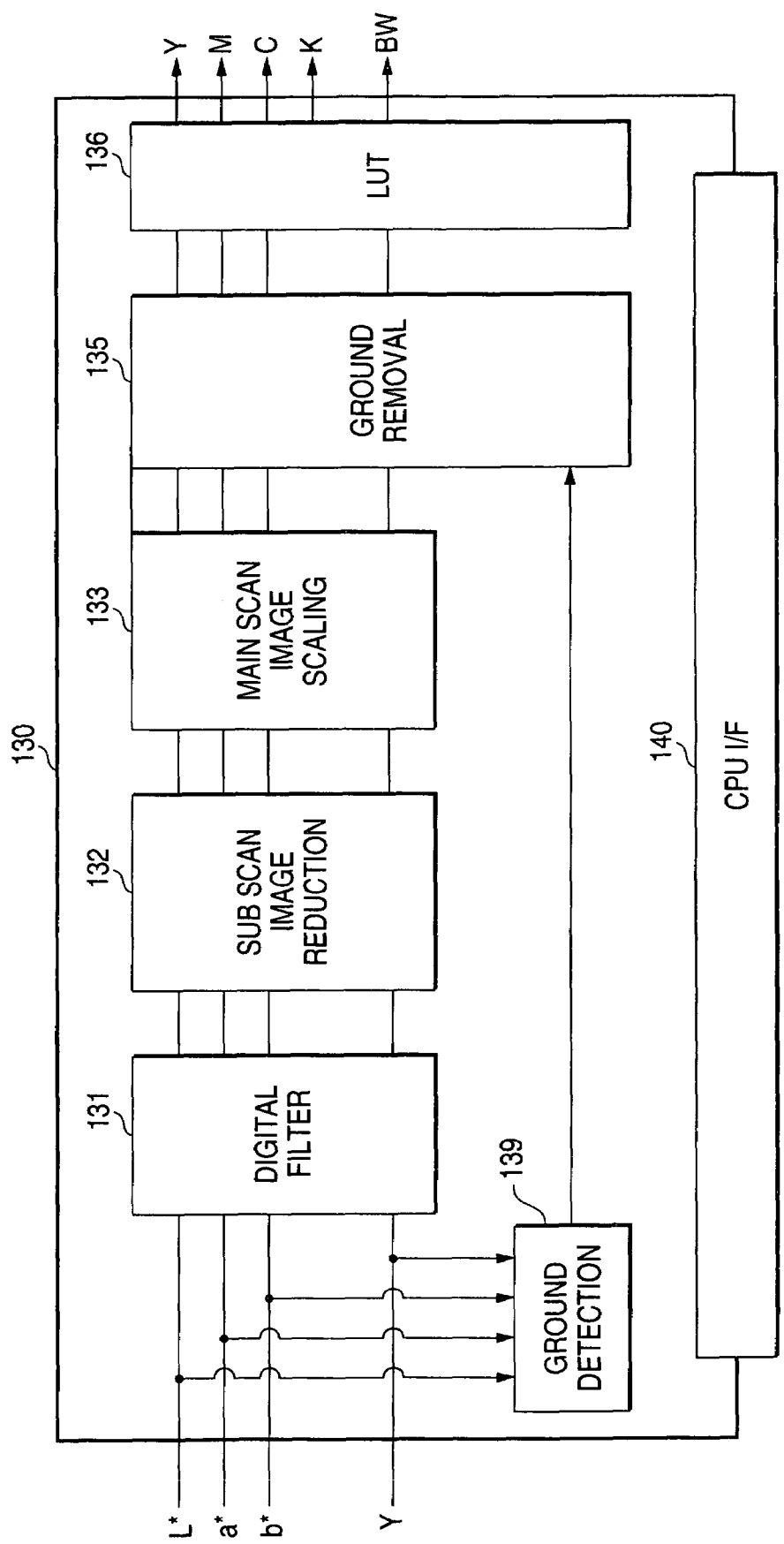
FIG. 7 is a block diagram showing a configuration of the Application-specific Integrated Circuit B (ASIC-B)

FIG. 7 is a block diagram showing a configuration of the Application-specific Integrated Circuit B (ASIC-B) 130. The Application-specific Integrated Circuit B 130 includes a digital filter 131 for performing MTF correction and smoothing on the input chrominance signals L*a*b* and the brightness signal Y, a sub scan image reducing section 132 for reducing the image in the sub scan direction as a document transfer direction, a main scan image scaling section 133 for scaling the image in the main scan direction which is the scan direction of the CCD image sensor 78 which is orthogonal to the document transfer direction, a ground removing section 135 for removing the ground of a document to be read, and a Look Up Table (LUT) 136 for converting L*a*b* color space signals to YMCK color space signals for color image data as well as converting a Y color space signal to a BW signal. The Application-specific Integrated Circuit B 130 further includes a ground detecting section 139 for detecting the ground of a document to be read based on the input chrominance signals L*a*b and brightness signal Y, and a CPU interface (CPU IF) 140 for communicating with the first CPU 101.

Figure 8:
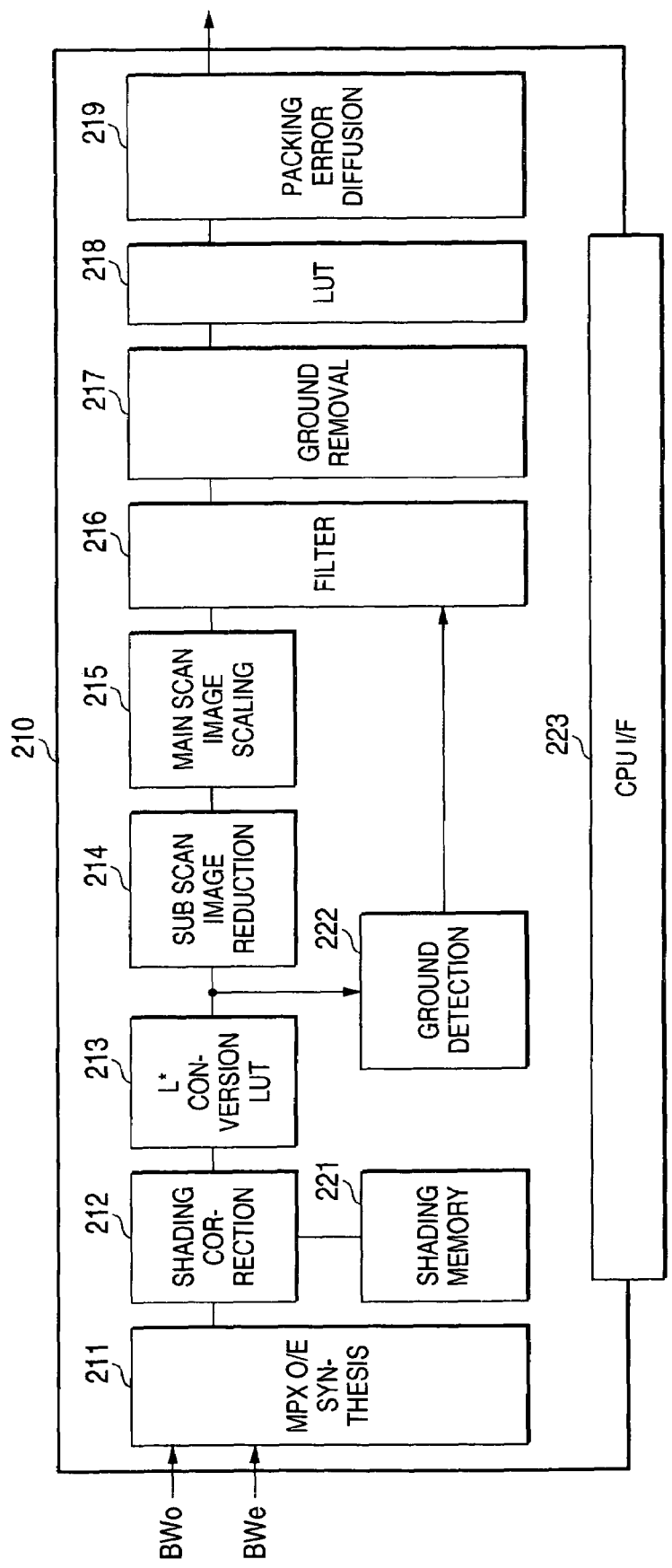
FIG. 8 is a block diagram showing a configuration of the Application-specific Integrated Circuit C (ASIC-C)

FIG. 8 is a block diagram showing a configuration of the Application-specific Integrated Circuit C (ASIC-C) 210. To the Application-specific Integrated Circuit C 210 are input a BWo (Odd) output and a BWe output (Even). The Application-specific Integrated Circuit C 210 includes a multiplex (MPX) circuit 211 for synthesizing (O/E synthesizing) the monochrome output signals on two channels, Odd and Even, a shading corrector 212 for performing shading correction based on the shading data stored in the shading memory 221, an L* converter (LUT) for correcting the input gradation, a sub scan image reducing section 214 for reducing the image in the sub scan direction, a main scan image scaling section 215 for scaling the image in the main scan direction, a filter 216 for performing MTF correction and smoothing on the input signals, a ground removing section 217 for removing the ground of a document to be read based on the ground detecting section 222, a Look Up Table (LUT) 218 for correcting the output gray scale, and an error diffusion (Packing error diffusion) section 219 for performing binarization. The Application-specific Integrated Circuit C 210 also includes a CPU interface 223 for communicating with the second CPU 201.

In this embodiment, it is possible to read, by using the scanner 70 (CCD image sensor 78), the document sheet to be conveyed to the platen roll 19 through the second platen glass 72B in reading an image through document transfer with the document feeder 10. It is also possible to use the CIS 50 provided on the document feeder 10 to read the image. The problem is that, as mentioned earlier, the depth of focus differs resulting in a different resolution characteristic between image reading by way of the CCD image sensor 78 which employs the mechanism of the scanner 70 and image reading by way of the SELFOC lens 53 of the CIS 50. In particular, in case a color image such as a photograph is to be read, reading by way of these two approaches makes it difficult to harmonize the colors, thus resulting in different picture qualities between the two reading methods. To cope with this, the embodiment provides a plurality of read modes so as to allow selection of an optimum mode based on the setting of apparatus, type of document and the user's selection.

Figure 9:
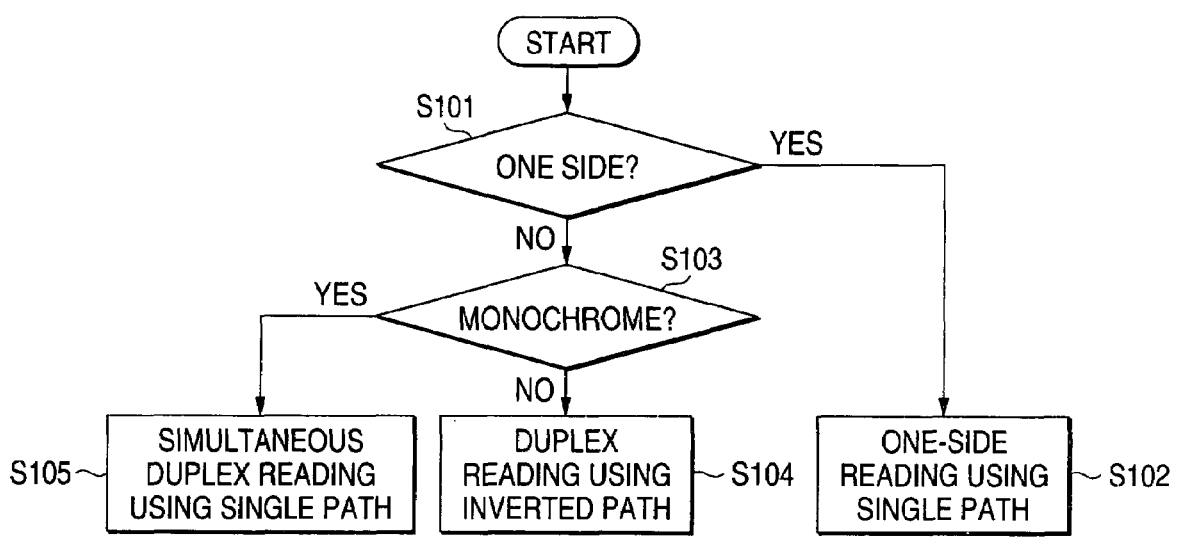
FIG. 9 is a flowchart of an example of processing executed by an image reading control.

FIG. 9 is a flowchart of an example of processing executed by the image read control 91 shown in FIG. 4. The image read control 91 first determines whether the document to be transferred is a double-side document sheet or a one-side document sheet (step 101). This determination can be recognized for example from the user's selection using a control panel (not shown) provided on the scanner 70 or sensors (not shown) provided on both sides of the first transfer path 31 prior to the image read process in case the automatic selective read feature is working, for example. The determination can be recognized also by way of a request issued from a host system or the user's selection through a network. In case it is determined that the document is a one-side document sheet in step 101, one-side reading is made through a single pass (a single document transfer pass without an inverted pass) (step 102). The single pass one-side reading may employ either the reading by way of the CCD image sensor 78 or reading by way of the CIS 50, although the former is preferred when wishing to obtain a higher-quality image. In this practice, a bunch of originals should be placed on the document tray 11 with the document side facing upward and the first page on top. The document sheets are conveyed starting with the first page and are sequentially read.

In case it is determined that the document is not a one-side document sheet but a double-side document sheet in step 101, it is determined whether monochrome reading of the document is specified by the user (step 103). This determination is made for example based on the user's selection using the control panel (not shown) provided on the scanner 70. Thus, in case the user wishes to read the document sheet as a monochrome sheet even when the document sheet is a color document, the monochrome reading is selected. In case the monochrome reading is not performed, that is, color reading is performed, duplex reading is carried out by using an inverted pass (step 104). That is, reading by the CIS 50 is skipped and both the first side and second side of the document sheet are read by way of the CCD image sensor 78 as a first sensor. This assures high-quality duplex reading of the first side and second side of the document sheet by way of read means with a deep depth of focus.

In case it is determined that monochrome reading is performed in step 103, simultaneous duplex reading through a single pass is made without using an inverted pass (step 105). That is, the first side is read by the CCD image sensor 78 as a first sensor and the second side is simultaneously read by the CIS 50 in the same transfer pass. This eliminates the need for conveying the document sheet to the same reader twice, which increases the document read speed as well as simplifies the transfer path, thereby suppressing document transfer troubles including a paper jam. As mentioned earlier, "simultaneous reading" does not necessarily refer to perfect coincidence of time but refers to reading of both sides during a single pass transfer of a same document sheet.

A method for transferring a document sheet in each document read mode is described referring to FIGS. 10 and 11.

Figure 10A:
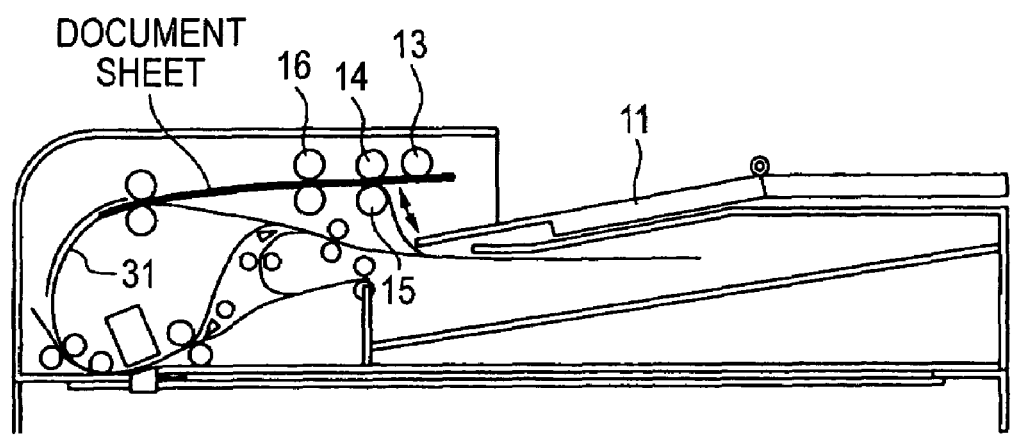
FIG. 10A illustrates a document pass in the one-side reading using a single pass.
Figure 10B:
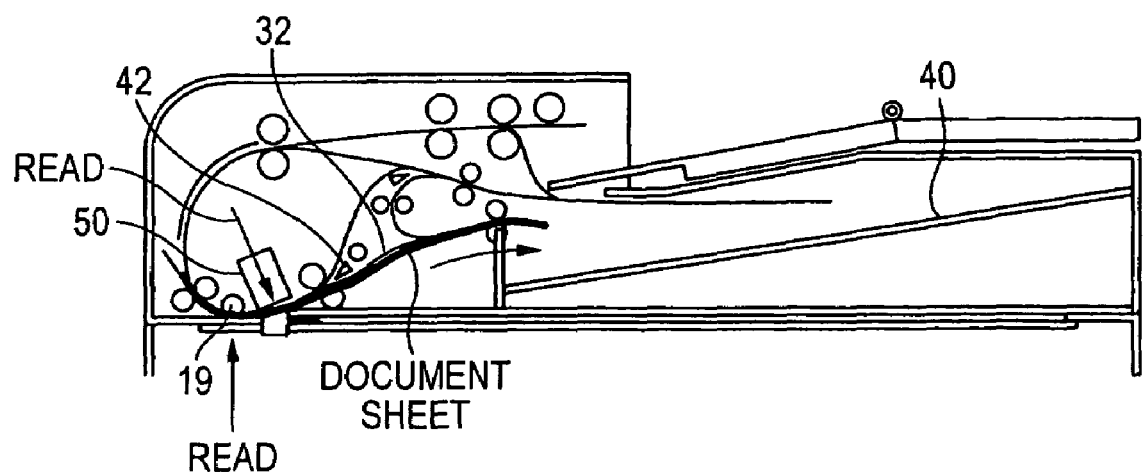
FIG. 10B illustrates a document pass in a second duplex reading as simultaneous duplex reading using a single pass.

FIGS. 10A and 10B show the document pass of the single pass one-side read mode shown in step 102 of FIG. 9 and that of the single pass simultaneous duplex read mode shown in step 105. As shown in FIG. 10A, document sheets placed on the document tray 11 are sequentially supplied to the first transfer path 31 by the nudger roll 13, the feed roll 14, the retard roll 15, and the take-away roll 16. The document sheets supplied are conveyed by the transfer path switching gate 42 to the second transfer path 32 through the reader of the platen roll 19 and the CIS 50 and sequentially discharged to the discharge tray 40. In the case of one-side reading, reading is made from below using the CCD image sensor 78 of the scanner 70 shown in FIG. 1 at the position of the platen roll 19. Note that one-side reading using the CIS 50 is also possible, as mentioned earlier. In the case of the single pass simultaneous duplex reading, the CCD image sensor 78 of the scanner 70 may be used to read the first side and the CIS 50 is used to read the second side in the same transfer pass. This allows duplex document reading by way of a single document pass.

Figure 11A:
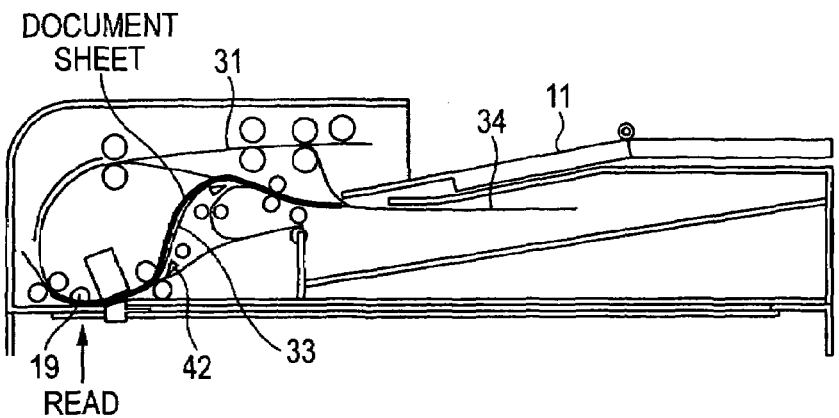
FIG. 11A illustrates duplex reading using an inverter pass.
Figure 11B:
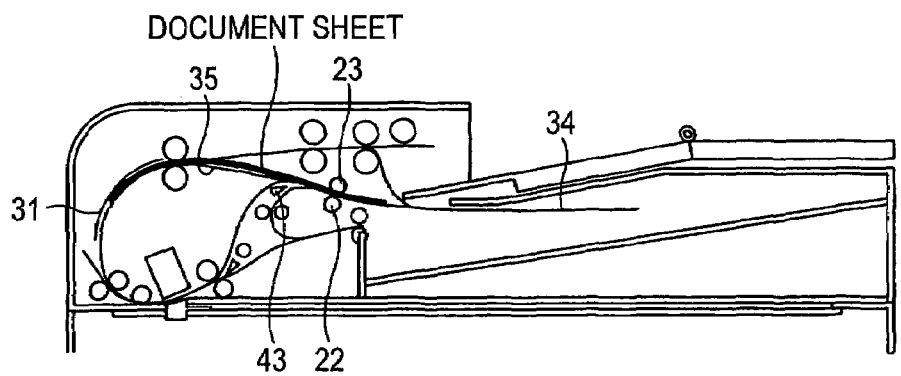
FIG. 11B illustrates duplex reading using an inverter pass.

FIGS. 11A through 11D show the duplex read mode using an inverted pass in step 104 of FIG. 9. As shown in FIG. 11A, document sheets placed on the document tray 11 are sequentially supplied to the first transfer path 31 and reading is made from below using the CCD image sensor 78 of the scanner 70 shown in FIG. 1 at the position of the platen roll 19. The document sheets are conveyed by the transfer path switching gate 42 to the fourth transfer path 34 through the third transfer path 33. A document sheet which has completely passed through the third transfer path 33 is switched back by the inverter roll 22 and the inverter pinch roll 23 and supplied to the fifth transfer path 35.

Figure 11C:
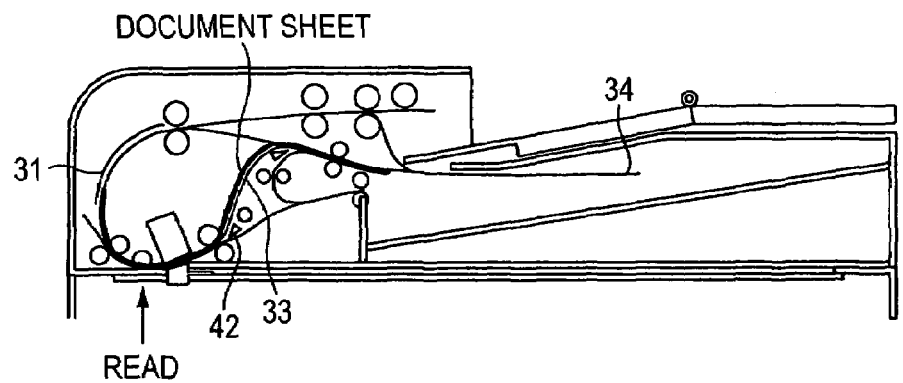
FIG. 11C illustrates duplex reading using an inverter pass.
Figure 11D:
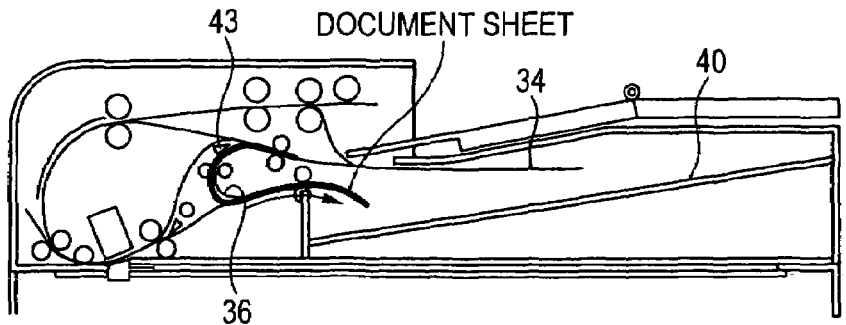
FIG. 11D illustrates duplex reading using an inverter pass.

A document sheet supplied to the fifth transfer path 35 is supplied to the first transfer path 31 again. The document sheet is read from below by the CCD image sensor 78 of the scanner 70, as shown in FIG. 11C. In this practice, the document sheet is inverted with reference to the case shown in FIG. 11A and thus the second side opposite to the first side is read. The document sheet whose second side has been read is inverted. Discharging the document sheet to the discharge tray 40 in this orientation results in an erroneous page order of the document read and stacked. In order to solve this problem, as shown in FIG. 11C, a document sheet with second side read is conveyed by the transfer path switching gate 42 to the fourth transfer path 34 through the third transfer path 33. A document sheet which has been supplied to the fourth transfer path 34 and which has completely passed through the exit switching gate 43 is directed by the exit switching gate 43 to the discharge tray 40 through the sixth transfer path 36, as shown in FIG. 1D. This sorts the page order of the read bunch of document in the first simultaneous duplex read mode which sequentially reads the images on the front and rear sides of a document sheet.

Processing of an image read by the CCD image sensor 78 and the CIS 50 will be detailed.

In this embodiment, image reading is made by the CCD image sensor 78 and image processing executed by the first image processor circuit 100 in any of the one-side read mode using a single pass (step 102), duplex read mode using an inverted pass (step 104), and simultaneous duplex read mode using a single pass (step 105). In this embodiment, color image reading and monochrome image reading are constantly being performed by the CCD image sensor 78 independently of the selected read mode and the read color image data and monochrome data are processed by the first image processor circuit 100 and output therefrom.

A flow of specific image processing in the first image processor circuit 100 is described first. In this processing, output signals R, G, B, BWo, BWe from the CCD image sensor 78 are input to the Application-specific Integrated Circuit A 110 through the AFE 102. The output signals R, G, B as color read data undergo shading correction in the shading corrector 112, gap correction in the GAP corrector 113, and black line correction in the black line corrector 114. Next, the output signals RGB undergo input gray scale correction, or to be more precise, reflectivity density conversion which converts the output signals R, G, B as color reflectivity data to image densities in the ENL 115, and the output signals RGB are converted to a luminance signal L* and chromaticity signals a*b* (these three are generally referred to as chrominance signals) in the color space converter 116. An addition LUT for monochrome correction is generated in the addition LUT generator 117 and the chrominance signals L*a*b* are output to the Application-specific Integrated Circuit B 130. The addition LUT generated in the addition LUT generator 117 is output to the monochrome corrector 118. The addition LUT generated in the addition LUT generator 117 will be detailed later.

The chrominance signals L*a*b* input to the Application-specific Integrated Circuit B 130 undergoes MTF correction and smoothing in the digital filter 131 and scaling in the sub scan image reducing section 132 or the main scan image scaling section 133 as required. The input chrominance signals L*a*b* are used to detect the ground of the document in the ground detecting section 139 and the ground is removed in the ground removing section 135. The chrominance signals L*a*b* are color converted to yellow (Y), magenta (M), cyan (C) and black (K) as color image data in the Look Up Table 136 and are output therefrom.

The output signals BWo, BWe as monochrome read data are synthesized into a single monochrome output signal BW in the multiplex circuit 111. The output monochrome signal BW obtained undergoes shading correction in the shading corrector 112, gap correction in the GAP corrector 113, and black line correction in the black line corrector 114. Next, the output monochrome signal BW undergoes input gray scale correction, or to be more precise, reflectivity luminance conversion which converts the output signal BW as monochrome reflectivity data to a BW luminance signal in the ENL 115. The BW luminance signal is corrected by using the addition LUT output from the addition LUT generator 117 in the monochrome corrector 118, and a brightness signal Y thus obtained is output to the Application-specific Integrated Circuit B 130.

The brightness signal Y input to the Application-specific Integrated Circuit B 130 undergoes MTF correction and smoothing in the digital filter 131 and scaling in the sub scan image reducing section 132 or the main scan image scaling section 133 as required. The brightness signal Y and the input chrominance signals L*a*b* are used to detect the ground of the document in the ground detecting section 139 and the ground is removed in the ground removing section 135. The brightness signal Y is color converted to black and white (BW) as monochrome image data in the Look Up Table 136 and is output therefrom.

In this embodiment, image reading is made by the CIS 50 and image processing performed by the second image processor circuit 200 only in the simultaneous read mode using a single pass (step 105). The CIS 50 performs monochrome image reading only.

A flow of specific image processing in the second image processor circuit 200 is described below. In this processing, output signals BWo, BWe from the CIS 50 are processed in the AFE 82 and the ADC 83 as required and are input to the Application-specific Integrated Circuit C 210. The signals BWo, BWe as monochrome read data are synthesized into a single output signal BW in the multiplex circuit 211. The monochrome output signal BW thus obtained undergoes shading correction in the shading corrector 212 and input gray scale correction, or to be more precise, reflectivity luminance conversion which converts the output signal BW as monochrome reflectivity data to a BW luminance signal in the L* converter (LUT) 213. The BW luminance signal undergoes scaling in the sub scan image reducing section 214 or the main scan image scaling section 215 as required, and smoothing in the filter 216. The BW luminance signal is used to detect the ground of the document in the ground detecting section 222 and the ground is removed in the ground removing section 217. The BW luminance signal then undergoes output gray scale correction in the Look Up Table (LUT) 218 and binarization in the error diffusion (Packing error diffusion) section 219, and is output as monochrome image data.

In this embodiment, it is possible to perform monochrome reading even in case a color image is formed on both sides of a document sheet based on the user's selection, as well as for example in case a monochrome image is formed on both sides of a document sheet in the simultaneous duplex read mode using a single pass. The simultaneous duplex read mode using a single pass is selectable only in monochrome reading. Thus, in this embodiment, a light source for the CIS 50 uses an LED 52 illuminating in YG color and a line sensor 54BW for Black-White as an image sensor, as mentioned earlier. The scanner 70 must read a monochrome image as well as a color image for example in the inverted reading by way of two passes. Thus, a light source for the scanner 70 uses a xenon lamp having a wider emission wavelength range than the LED 52. As image sensors, the line sensor 78BW for Black-White and color sensors (line sensor 78R for Red, line sensor 78G for Green and line sensor 78B for Blue) are used.

In case a document sheet where a monochrome image is formed on both sides is to be read in monochrome reading, it is necessary to modify only the coefficient of gray scale correction in the ENL 115 of the first image processor circuit 100. This provides images of a uniform density on both sides of the document sheet. In case a document sheet where color images are formed on both sides is to be read in the single pass simultaneous duplex read mode, the above gray scale correction alone cannot properly provide images of a uniform density on both sides. More precise description is given below. The CIS 50 can detect the density of an image as long as the image has a wavelength component included in the emission wavelength range of the LED 52, such as green and yellow, so that the CIS 50 can read the color images as monochrome images ranging from gray to black according to the density of the image. The CIS 50 cannot detect the density of an image having a wavelength component out of the emission wavelength range of the LED 52, such as blue and red, thus reading all images as black irrespective of the density of the image. For the scanner 70, all colors, from blue to red, are included in the emission wavelength range of the xenon lamp (illumination lamp 74). The scanner 70 can thus detect the density of all images within the visible wavelength range and read the color images as monochrome images ranging from gray to black according to the density of the image. That is, in case a document where the same color image is formed on both sides is to be read in the single pass duplex reading by using the scanner 70 and the CIS 50, image data on the front side and image data on the rear side having separate densities (having a difference in density) are respectively output.

In this embodiment, in order to solve the problem, an addition LUT for monochrome correction is generated in the addition LUT generator 117 of the first image processor circuit 100 based on colors included in the image of the document, that is, color image data read by the scanner 70 (CCD image sensor 78), and the addition LUT is used to correct monochrome image data read by the same scanner 70 (CCD image sensor 78) in the monochrome corrector 118, in monochrome reading of images on both sides of a document sheet in the simultaneous duplex read mode using a single pass. This brings the density of a monochrome image read by the CCD image sensor 78 close to the density of a monochrome image read by the CIS 50 (line sensor 54), thereby reducing the difference between the image densities on the front and rear sides of the document sheet.

To be more precise, the following expression is used to generate an addition LUT in the addition LUT generator 117 based on the chrominance signals L*a*b* output from the color space converter 116:

$$Y = (-0.5182 \times a^* + 67.947) \times L^*/225 + 128 \qquad (1)$$

The expression (1) is previously obtained and set for the purpose of bringing the density of a monochrome image read by the CCD image sensor 78 close to the density of a monochrome image read by the CIS 50 (line sensor 54). This allows the monochrome corrector 118 to correct to a higher value the density of a blue and red images whose densities cannot be read by the line sensor 54BW for Black-White on the CIS 50 due to the difference of light source, and output the images. In other words, the monochrome corrector 118 can output images whose densities cannot be read by the line sensor 54BW at the same image density as the monochrome image read by the CIS 50.

It is assumed that in a part of a front-face image, colorimetry values measured by a densitometer with using white color as a reference is 1.45. In this case, a user does not often feel a sense of incongruity on image quality resulted from the density difference so long as colorimetry values in a equivalent part of a rear-face image, which originally has the colorimetry values 1.45, is in a range of 1.35-1.55 (±7%).

In this embodiment, use of such an approach allows the density of a monochrome image read by the scanner 70 (line sensor 78BW for Black-White on the CCD image sensor 78) close to the density of a monochrome image read by the CIS 50 (line sensor 54BW for Black-White on the line sensor 54). This makes it possible to approximately match the densities of images on the front and rear sides even in case full-color images formed on both sides of a document sheet is read as a monochrome image.

This embodiment is approximately the same as Embodiment 1 except that the CIS 50 also has a color image read feature so as to allow the user to select whether the image density on the front side (readout result by the CCD image sensor 78) or image density on the rear side (readout result by the CIS 50) is used as a target uniform density in the simultaneous duplex reading using a single pass. The same components as those in Embodiment 1 are give the same signs and the corresponding details are omitted.

Figure 12A:
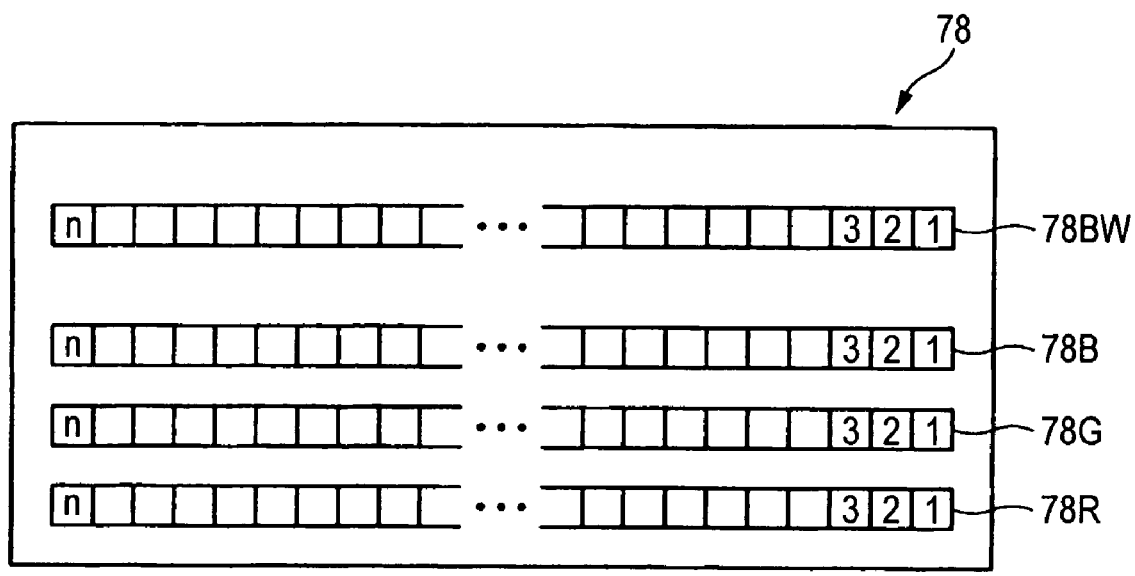
FIG. 12A is a schematic view of a CCD image sensor provided on a scanner.
Figure 12B:
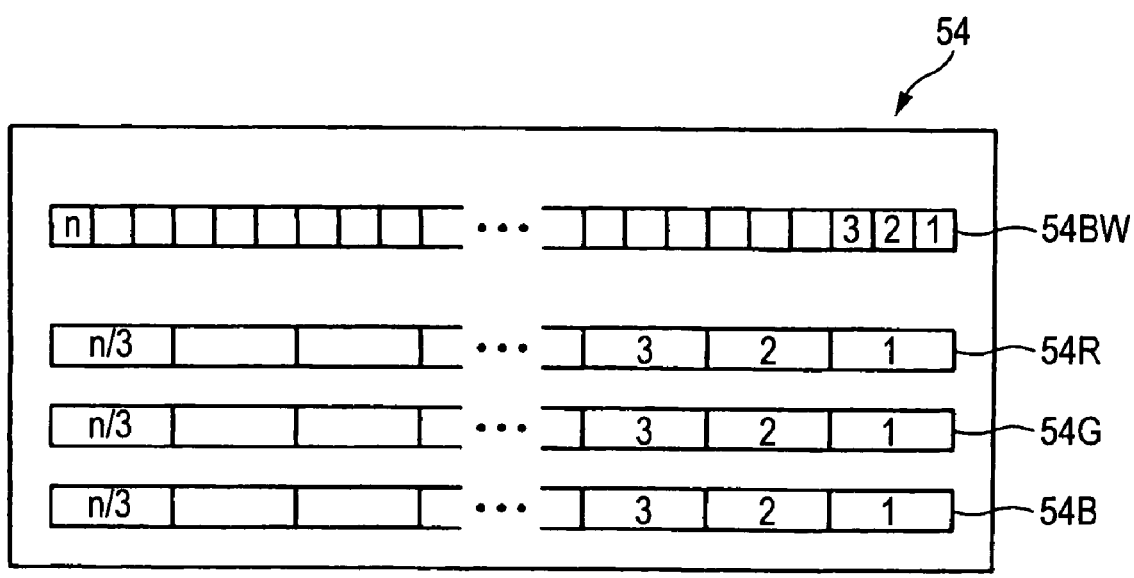
FIG. 12B is a schematic view of a line sensor provided on the CIS.

FIG. 12A is a schematic view of a CCD image sensor 78 provided on a scanner 70. On the CCD sensor 78 are arranged in parallel four line sensors 78R, 78G, 78B and 78BW in the direction orthogonal to the document transfer direction, same as Embodiment 1. FIG. 12B is a schematic view of a line sensor 54 provided on the CIS 50. In this embodiment, a line sensor 54R for Red, a line sensor 54G for Green, and a line sensor 54B for Blue as well as a line sensor 54BW for Black-White (another monochrome sensor) are provided on the line sensor 54. Each of the line sensor 54R for Red, the line sensor 54G for Green, and the line sensor 54B for Blue includes n/3 phototransistors PT on a straight line, that is, one third the number of phototransistors PT of the line sensor 54BW for Black-White. Thus, each of the line sensors 54R, 54G and 54B has a lower resolution than the line sensor 54BW for Black-White and the line sensors 78R, 78G and 78B as color sensors on the CCD image sensor 78. This is because the color line sensors 54R, 54G, 54B provided on the CIS 50 are arranged only for matching the density between the front and rear sides. In this embodiment also, the single pass simultaneous duplex read mode can be selected only in case color images formed on both sides of a document sheet are read as monochrome images.

Figure 13:
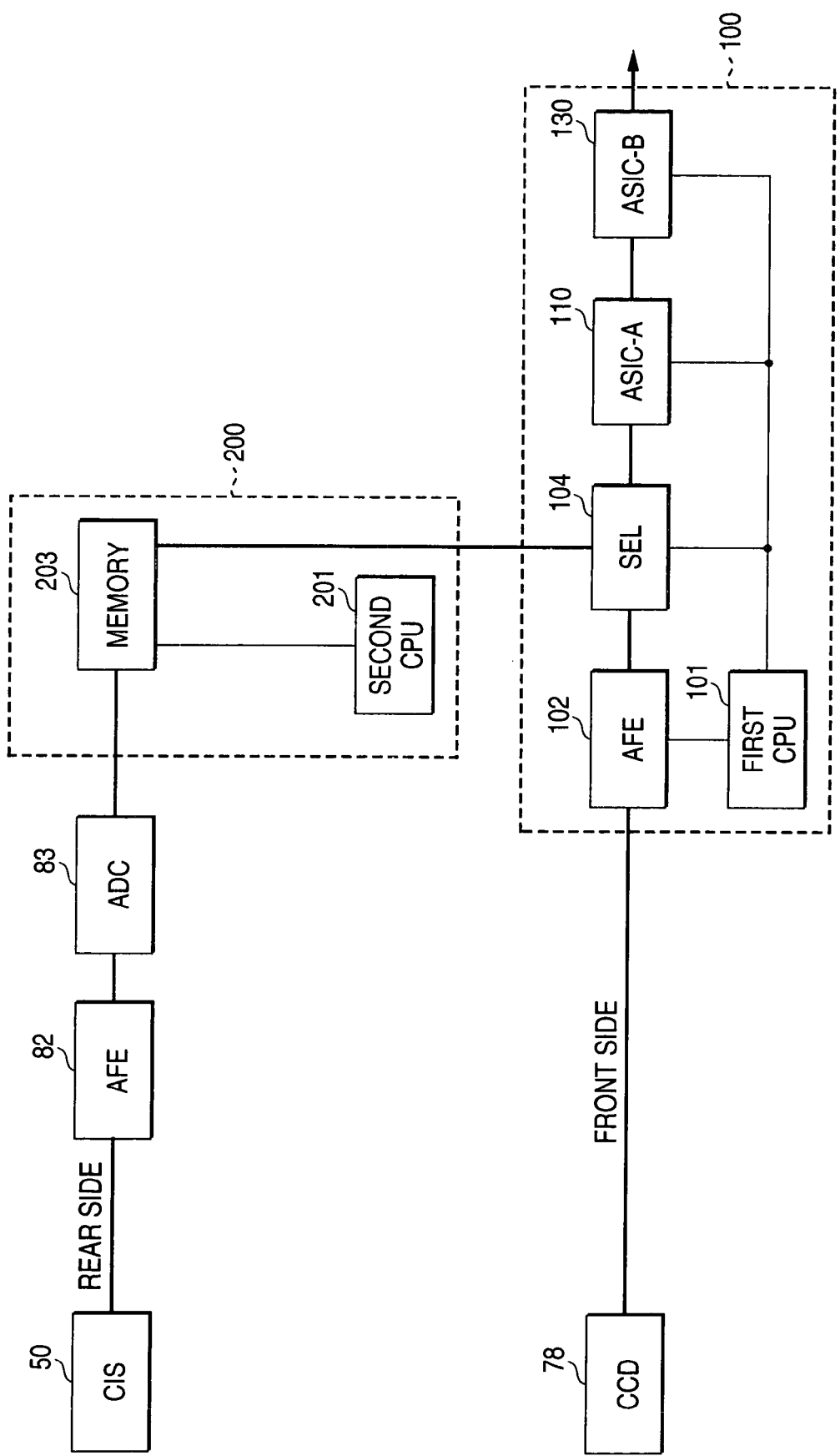
FIG. 13 is a block diagram of a detailed configuration of the signal processor according to Embodiment 2.

FIG. 13 is a block diagram of a detailed configuration of the signal processor 81 according to Embodiment 2. A first image processor circuit 100 includes a first CPU 101 for controlling the entire system, an AFE 102 for performing processing such as sample hold, offset adjustment and A/D conversion on front side image data output from the CCD image sensor 78 as well as a selector (SEL) 104 for selective output of image data on both sides. The first image processor circuit 100 further includes an Application-specific Integrated Circuit A (ASIC-A) 110 for performing shading correction and inter-line correction (dislocation interpolation of RGB and BW) and an Application-specific Integrated Circuit B (ASIC-B) 130 for performing MTF filtering, scaling and binarization. The Application-specific Integrated Circuit A 110 and the Application-specific Integrated Circuit B 130 are the same as those in Embodiment 1. A second image processor circuit 200 includes a second CPU 201 for controlling the entire system and a memory 203 for temporarily retaining (storing) the rear-side image data prior to image processing and outputting the data to the selector 104 at a predetermined output timing. In this embodiment, the second image processor circuit 200 does not include an Application-specific Integrated Circuit C.

In this embodiment, in case the simultaneous duplex read mode using a single pass shown in step 105 in FIG. 9 is selected, the image data on the first side of a document sheet read by the scanner 70 (CCD image sensor 78) is processed by the first image processor circuit 100 and output therefrom. On the other hand, the image data on the second side of a document sheet read by the CIS 50 (lien sensor 54) is once stored in the memory 203. After the image processing of the image data on the first side of a document sheet is performed by the first image processor circuit 100, the image data on the second side of a document sheet is input to the first image processor circuit 100 from the memory 203 so that the image processing of the second side of a document sheet is performed and a result is output.

Figure 14:
FIG. 14 shows an exemplary menu displayed on a user interface.
Figure 14:
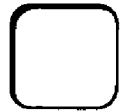

FIG. 14 shows an exemplary menu as an acceptor displayed on a user interface (not shown) provided on the scanner 70 in case the simultaneous duplex read mode using a single pass is selected. In this example, the user can selects either a "sharpness" mode for providing a high-contrast readout image and a "Gray scale reproduction" mode for providing a readout image which places special emphasis on the halftone or gray scale.

In case the "sharpness" mode is selected in reading of images on both sides of a document sheet in the simultaneous duplex read mode using a single pass, an addition LUT for monochrome correction is generated in the addition LUT generator 117 of the first image processor circuit 100 based on the color image data read by the scanner 70 (CCD image sensor 78), and the addition LUT is used to correct and output monochrome image data read by the same scanner 70 (CCD image sensor 78) in the monochrome corrector 118. The addition LUT can be generated based on the expression (1) described in Embodiment 1. The monochrome image data read by the CIS 50 (line sensor 54) is output without correction using the addition LUT in the monochrome corrector 118. This brings the density of the monochrome image read by the CCD image sensor 78 close to the density of the monochrome image read by the CIS 50 (line sensor 54), thereby reducing the difference between the image densities on the front and rear sides of the document sheet. In this practice, it is possible to obtain high-contrast monochrome image data on both sides of the document sheet.

In case the "Gray scale reproduction" mode is selected in reading of images on both sides of a document sheet in the simultaneous duplex read mode using a single pass, an addition LUT for monochrome correction is generated in the addition LUT generator 117 of the first image processor circuit 100 based on the color image data read by the CIS 50 (line sensor 54), and the addition LUT is used to correct and output monochrome image data read by the same CIS 50 (line sensor 54) in the monochrome corrector 118. The addition LUT can be generated based on an expression other than the expression (1) described in Embodiment 1. The monochrome image data read by the scanner 70 (CCD image sensor 78) is output without correction using the addition LUT in the monochrome corrector 118. This brings the density of the monochrome image read by the CIS 50 close to the density of the monochrome image read by the CCD image sensor 78, thereby reducing the difference between the image densities on the front and rear sides of the document sheet. In this practice, it is possible to obtain monochrome image data with good gray scale reproducibility on both sides of the document sheet.

In this embodiment, it is possible to select either a high-contrast image or an image with good gray scale reproducibility in the simultaneous duplex read mode using a single pass, thereby satisfying the needs of a variety of users.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An image reading apparatus comprising:
   a feeder that feeds a sheet;
   a transfer path on which the sheet fed by the feeder is transferred;
   a first reading unit positioned on a first side of the transfer path that captures an image on a face of the sheet from the first side of the transfer path, the first reading unit including at least one color sensor for capturing color image data and a first monochrome sensor for capturing monochrome image data;
   a second reading unit positioned on a second side of the transfer path that captures an image on a face of the sheet from the second side of the transfer path, the second reading unit consisting of a second monochrome sensor for capturing monochrome image data;
   a mode selection unit for selecting a monochrome mode or a color mode;
   an inversion unit in the transfer path that inverts the sheet; and
   a correction unit that substantially equalizes image density of captured first image data and captured second image data,
   wherein:
   when the monochrome mode is selected, the captured first image data is captured by the first monochrome sensor in the first reading unit and the captured second image data is captured by the second monochrome sensor in the second reading unit on a single transfer of the sheet through the transfer path, and
   when the color mode is selected, the captured first image data is captured by the at least one color sensor in the first reading unit on a first transfer of the sheet through the transfer path, the sheet is inverted by the inversion unit and the captured second image data is captured by the at least one color sensor in the first reading unit on a second transfer of the sheet through the transfer path.

2. The image reading apparatus according to claim 1, wherein the correction unit corrects one of the first image data and the second image data so that the image density of the first image data is in a range of ±7% of the image density of the second image data.

3. The image reading apparatus according to claim 1, wherein the correction unit corrects the first monochrome image data so that the image density of the first monochrome image data is in a range of ±7% of the image density of the second monochrome image data.

4. The image reading apparatus according to claim 1, wherein the first image data obtained by the first reading unit has a first image density and the second image data obtained by the second reading unit has a second image density, the first image density being different from the second image density.

5. The image reading apparatus according to claim 1, wherein the first image data is corrected to substantially equalize the image density of the first image data to that of the second image data based on the image density of the second image data.

6. The image reading apparatus of claim 1, wherein the correction unit selects either an image density of the captured first image data or the captured second image data as a target density, and corrects the other of the first captured image data or the captured second image data using the image density of the selected captured image data as a reference.

7. The image reading apparatus of claim 6, wherein an output value of a sensor that is not selected is corrected using an LUT to substantially equalize the image density of the captured first image data and captured second image data.

8. An image reading apparatus comprising:
   a transfer path on which a sheet is transferred;
   a first reading unit positioned on a first side of the transfer path that captures an image on a face of the sheet, the first reading unit including a first light source for emitting light to the face of the sheet from the first side of the transfer path and a plurality of sensors for receiving reflected light from the sheet, the plurality of sensors comprising at least one color sensor for capturing color image data and a first monochrome sensor for capturing monochrome image data;
   a second reading unit positioned on a second side of the transfer path that captures an image on a face of the sheet, the second reading unit including a second light source for emitting light to the face of the sheet from the second side of the transfer path and a sensor for receiving a reflected light from the sheet, the sensor consisting of a second monochrome sensor for capturing monochrome image data;
   a mode selection unit for selecting a monochrome mode or a color mode;
   an inversion unit in the transfer path that inverts the sheet; and
   a correction unit that corrects captured first image data so as to substantially equalize image density of the captured first image data with that of captured second image data,
   wherein:
   when the monochrome mode is selected, the captured first image data is captured by the first monochrome sensor in the first reading unit and the captured second image data is captured by the second monochrome sensor in the second reading unit on a single transfer of the sheet through the transfer path,
   when the color mode is selected, the captured first image data is captured by the at least one color sensor in the first reading unit on a first transfer of the sheet through the transfer path, the sheet is inverted by the inversion unit and the captured second image data is captured by the at least one color sensor in the first reading unit on a second transfer of the sheet through the transfer path, and
   the second light source has a wider emission wavelength range than the first light source.

9. The image reading apparatus according to claim 8, wherein
   the first light source is a xenon lamp, and
   the second light source is an LED.

10. The image reading apparatus according to claim 8, wherein
    the plurality of sensors includes a first image sensor for capturing the reflected light through a minification optical system, and the second monochrome sensor is a second image sensor for capturing the reflected light at a closer position than the first image sensor.

11. The image reading apparatus according to claim 8, wherein the correction unit corrects the first image data so that the image density of the first image data is in a range of ±7% of the image density of the second image data.

12. The image reading apparatus according to claim 8, wherein the first image data obtained by the first reading unit has a first image density and the second image data obtained by the second reading unit has a second image density, the first image density being different from the second image density.

13. The image reading apparatus according to claim 8, wherein the first image data is corrected to substantially equalize the image density of the first image data to that of the second image data based on the image density of the second image data.

14. An image reading apparatus comprising:
a feeder that feeds a sheet;
a transfer path on which the sheet fed by the feeder is transferred;
a first reading unit positioned on a first side of the transfer path that captures an image on a face of the sheet from the first side of the transfer path to obtain at least one of color image data or first monochrome image data;
a second reading unit positioned on a second side of the transfer path that captures an image on a face of the sheet from the second side of the transfer path to obtain second monochrome image data;
a mode selection unit for selecting a monochrome mode or color mode;
an inversion unit in the transfer path that inverts the sheet; and
a correction unit that (1) corrects the first monochrome image data captured by the first reading unit and the second monochrome image data captured by the second reading unit in the monochrome mode on a single transfer of the sheet through the transfer path, to substantially equalize image density of the first monochrome image data and the second monochrome image data, and (2) corrects first color image data captured by the first reading unit and second color image data captured by the first reading unit in the color mode on two transfers of the sheet through the transfer path with an inversion in between, to substantially equalize image density of the first color image data and the second color image data.

15. The image reading apparatus according to claim 14, further comprising:
a generating unit that, in the monochrome mode, generates a correction value for equalizing the image density of the first monochrome image data and the second monochrome image data, wherein
the correction unit corrects the first monochrome image data with the correction value.

16. The image reading apparatus according to claim 15, wherein the correction unit corrects the first monochrome image data so that the image density of the first monochrome image data is in a range of ±7% of the image density of the second monochrome image data.

17. The image reading apparatus according to claim 14, wherein the correction unit corrects the first monochrome image data so that the image density of the first monochrome image data is in a range of ±7% of the image density of the second monochrome image data.

18. The image reading apparatus according to claim 14, wherein the first image data obtained by the first reading unit has a first image density and the second image data obtained by the second reading unit has a second image density, the first image density being different from the second image density.

19. The image reading apparatus according to claim 14, wherein the first image data is corrected to substantially equalize the image density of the first image data to that of the second image data based on the image density of the second image data.

20. An image reading apparatus comprising:
a feeder that feeds a sheet;
a transfer path on which the sheet fed by the feeder is transferred;
a first reading unit positioned on a first side of the transfer path that captures an image on a face of the sheet from the first side of the transfer path, the first reading unit including at least one color sensor for capturing color image data and a first monochrome sensor for capturing monochrome image data;
a second reading unit positioned on a second side of the transfer path that captures an image on a face of the sheet from the second side of the transfer path, the second reading unit consisting of a second monochrome sensor for capturing monochrome image data;
a mode selection unit for selecting a color mode or a monochrome mode;
an inversion unit in the transfer path that inverts the sheet; and
an acceptor that accepts a selection concerning correcting an image density of captured image data,
wherein:
when the monochrome mode is selected, first image data is captured by the first monochrome sensor in the first reading unit and second image data is captured by the second monochrome sensor in the second reading unit on at a single transfer of the sheet through the transfer path,
when the color mode is selected, first image data is captured by the at least one color sensor in the in the first reading unit on a first transfer of the sheet through the transfer path, the sheet is inverted by the inversion unit and second image data is captured by the at least one color sensor in the first reading unit on a second transfer of the sheet through the transfer path, and
the acceptor accepts a selection concerning whether (a) to bring image density of the captured second image data close to that of the captured first image data, or (b) to bring the image density of the captured first image data close to that of the captured second image data.

21. The image reading apparatus according to claim 20, wherein the first reading unit and the second reading unit have light sources for emitting light to the sheet, respectively, each having a different emission characteristic.

22. The image reading apparatus according to claim 20, wherein the first reading unit and the second reading unit have sensors for capturing the image on the sheet, respectively, each of the first and second reading units having a different resolution characteristic.

23. The image reading apparatus according to claim 20, wherein the acceptor further accepts a selection concerning whether (a) to prioritize sharpness of the image, or (b) to prioritize reproducibility of the image density.

24. The image reading apparatus according to claim 20, wherein the first image data obtained by the first reading unit has a first image density and the second image data obtained by the second reading unit has a second image density, the first image density being different from the second image density.

25. The image reading apparatus according to claim 20, wherein the first image data is corrected to substantially equalize the image density of the first image data to that of the second image data based on the image density of the second image data.

* * * * *